United States Patent [19]

Broll et al.

[11] 3,847,639

[45] Nov. 12, 1974

[54] CERAMIC COLOR BODIES

[75] Inventors: Arno Broll, Rothenbergen;
Hermann Beyer, Grossauheim;
Herbert Mann, Dornigheim; Eugen Meyer-Simon, Frankfurt, all of Germany

[73] Assignee: Deutsche Gold- und Silber-Scheideanstalt vormals Roessler, Frankfort (Main), Germany

[22] Filed: May 1, 1973

[21] Appl. No.: 356,166

[30] Foreign Application Priority Data
May 5, 1972 Austria .................... 3969/72
May 5, 1972 Austria .................... 3970/72

[52] U.S. Cl.............. 106/288 B, 106/299, 106/292, 106/293
[51] Int. Cl................................ C08h 17/02
[58] Field of Search......... 106/288 B, 299, 293, 292

[56] References Cited
UNITED STATES PATENTS

| | | | |
|---|---|---|---|
| 1,719,432 | 7/1929 | Kinzie | 106/312 |
| 2,875,085 | 2/1959 | Morris et al. | 106/299 |
| 3,012,899 | 12/1961 | Giordano | 106/301 |
| 3,723,600 | 3/1973 | Redman | 423/263 |

FOREIGN PATENTS OR APPLICATIONS

| | | | |
|---|---|---|---|
| 1,058,919 | 6/1959 | Germany | 106/299 |
| 1,202,986 | 8/1970 | Great Britain | 106/299 |

*Primary Examiner*—Delbert E. Gantz
*Assistant Examiner*—Juanita M. Nelson
*Attorney, Agent, or Firm*—Cushman, Darby & Cushman

[57] ABSTRACT

A plural phase ceramic pigment is prepared that there are included in clear crystals of glaze stable materials inorganic, water free colored compounds as a separate internal phase.

24 Claims, No Drawings

CERAMIC COLOR BODIES

The invention concerns ceramic pigments. Ceramic pigments are added to a large extent for coloring glazes, for example, for wall panels, utility dishes, crockery, etc.

There are only known a few compounds which neither dissolve in the glaze baking nor react with the vitrification and are glaze stable. These colorless compounds in the pure conditions such as, for example, $ZrO_2$, $ZrSiO_4$, $SnO_2$, $Al_2O_3$, $ZnAl_2O_4$, $CeO_2$, $CePO_4$ and $CaSnSiO_5$ can be colored by including transition metal ions in the crystal lattice and used as ceramic pigments. The individual crystallites of these pigments are homogeneously colored; this is also true in microscopic examination.

Corresponding colors until now have only been obtained with transition metals of the first large period and the rare earths. Among the special glaze stable zirconium silicates there are known a blue $ZrSiO_4$ with included vanadium ions, a yellow $ZrSiO_4$ with included praseodymium, a green pigment with included chromium ions as well as zirconium iron rose. Besides there are known intensely colored pigments such as Thenards blue ($CoAl_2O_4$), titanium yellow (mixed crystals of $TiO_2$ and $NiSbO_4$), cadmium yellow (CdS) and cadmium red (Cd(S,Se)) which, however, dissolve in the glaze baking.

It has now been found that not only colored ions can be built into the glaze stable compounds of the crystal lattice but under suitable conditions complete crystals of inorganic colored compounds having a size of up to several millimicrons can be included.

The object of the invention is to produce a ceramic pigment which includes inside the clear crystals of glaze stable materials, inorganic, water free, colored compounds as a discrete or separate phase. The inclusions need not be glaze stable, but can also be, for example, Thenard's blue, titanium yellow, cadmium yellow or cadmium red. They are protected by the encasing crystal before undertaking the glaze baking.

As glaze stable materials there can be used $ZrO_2$, $SnO_2$, $CeO_2$, $CePO_4$, $Al_2O_3$(Zn, Mg, Co, Ni) (Al, Cr, Fe)$_2O_4$, $CaSnSiO_5$. Especially suited for carrying out the invention are glaze stable crystals of $ZrSiO_4$ and $SnO_2$. As colored compounds there are preferably used chalcogenides, particularly of chalcogens of atomic weight 32 to 79.

Especially interesting color tones are obtained by inclusion of sulfides, selenides and tellurides of zinc, cadmium and mercury or mixed crystals of these. Thus there can be used cadmium selenide, cadmium sulfide, cadmium telluride, mercury (II) sulfide, mercury (II) selenide, zinc selenide, zinc sulfide and zinc telluride.

It is also possible to use a colored compound as the glaze stable clear crystal. This glaze stable crystal is preferably colored zirconium silicate such as, for example, praseodymium dosed zirconium silicate ($ZrSiO_4/Pr^{4+}$) and vanadium dosed zirconium silicate ($ZrSiO_4/V^{4+}$).

Especially intense pigments are obtained if the sulfide, selenide or telluride or their mixed crystals are formed in the synthesis of the glaze stable compound, especially the zirconium silicate. In such case as starting material there is preferably added the zinc, cadmium, mercury and sulfur in the form of their oxygen compounds. As the sulfur containing raw material there are especially well suited sodium sulfite or sodium thiosulfate.

For the production of the pigments according to the invention a mixture of very finely divided $SnO_2$, CdO and $Na_2SO_3$ with a lithium halogenide, e.g., LiF, LiCl or LiBr as a mineralizer is heated to 1,200°C. The tin oxide crystals grow thereby and inclose the CdS which is formed from the cadmium oxide and sodium sulfite at elevated temperatures. There is obtained as a result yellow cadmium sulfide inclosed in colorless tin oxide crystals which protect the oxidation sensitive yellow inclusion from oxygen attack in the glaze baking. Analogously there is inclosed Cd(S,Se) in Zn (Al, Cr)$_2O_4$ if cadmium sulfide selenide is slowly formed in the spinel synthesis from zinc oxide, alumium oxide, and $Cr_2O_3$. There is obtained an intensive chrome rose which examined in the microscope consists of clear rose Zn(Al,Cr)$_2$ O$_4$ crystals and red, ingrowing Cd(S,Se) particles.

A yellow glaze stable zirconium silicate-inclosed pigment is obtained by heating a mixture of $ZrO_2$, $SiO_2$ and the non-glaze stable titanium yellow ($TiO_2$-$NiSbO_4$-mixed crystals). Under the microscope it can be recognized that small titanium yellow particles are ingrown in the colorless zirconium crystals. If instead of titanium yellow there is used finely divided Thenard's blue, there is formed a light blue occluded pigment.

If, for example, a mixture of zirconium oxide, silicon dioxide, cadmium oxide, sulfur and selenium is calcined under conditions which permit the formation of zirconium silicate (which can happen with the addition of a mineralizer from 600°C. or without a mineralizer above 1,100°C.), there is formed zirconium silicate and cadmium sulfide selenide. Both compounds can be identified by X-rays or microscopically; however, a greater part of the cadmium sulfide selenide small crystals are inclosed in the zirconium silicate. Non-inclosed Cd(S,Se) can be removed, for example, with $HNO_3$. There remains behind a glaze stable red pigment which is also stable against concentrated acids and air oxidation even over 1,000°C. and even over 1,200°C.

For the synthesis of zirconium silicate there can also be employed zirconium oxide and silicon dioxide producing compounds (for example $Na_2Zr_2SiO_5$). There can be used to form the cadmium sulfide selenide cadmium containing compounds, for example $CdCO_3$, $CdSO_4$, CdO, CdS, CdSe and compounds which contain sulfur such as $Na_2SO_4$, $Na_2SO_3$, $Na_2S_2O_5$, $Na_2S_2O_3$, $Na_2S_2O_4$, $Na_2S$ or the corresponding selenium salts, e.g., $Na_2Se_2O_4$, $Na_2SeO_3$, $Na_2Se_2O_5$, $Na_2Se_2O_3$, $Na_2Se_2O_4$ and $Na_2Se_2$ and their mixed crystals. The cadmium chalcogenide formed should make up 1 to 70 percent of zirconium silicate by weight. By addition of reducing agents (for example sugar, e.g., sucrose, or starch) the effectiveness of the oxidic sulfur and selenium compound can be improved. The color of the Cd($S_x$Se$_{1-x}$) inclusion can be varied according to the sulfur and selenium portions from yellow ($x$ is 1) to orange, light red and dark red to black ($x$ is 0).

Color changes of the inclusions can also be produced by the formation of mixed crystals between Cd($S_x$Se$_{1-x}$) and other metal chalocogenides (Zn, Hg) (S,Se).

Thus there are formed light yellow pigments, if mixed crystals of CdS and ZnS with up to 50 mol percent zinc are inclosed in the zirconium silicate according to the above mentioned process and orange colored pigments if mixed crystals of CdS and HgS are inclosed.

Instead of colorless zirconium silicates there can also be used colored zirconium silicates. If the known synthesis of praseodymium yellow is undertaken in the presence of CdS there is obtained by the CdS inclusion an intensive yellow pigment. Likewise it is possible to inclose CdS in vanadium blue. By the inclusion of Thenard's blue in praseodymium yellow there is formed a green pigment.

Unless otherwise indicated all parts and percentages are by weight.

EXAMPLE 1

31 grams of $ZrO_2$, 15 grams of $SiO_2$, 1.9 grams of NaCl, 1.5 grams of NaF and 9 grams of titanium yellow were mixed by grinding for 10 minutes in a ball mill and heating in a crucible to 850°C. for 1 hr. There was formed a light yellow zirconium silicate pigment having titanium yellow inclusions.

EXAMPLE 2

An intimate mixture of 2,381 grams of $ZrO_2$, 1,174 grams of $SiO_2$, 950 grams of $CdCO_3$, 129 grams of Se, 188 grams of S and 178 grams of LiF were kneaded for 15 minutes with 1,300 ml of water poured into a correspondingly large crucible and heated to 900°C. for 90 minutes. After the grinding of the reaction mixture and the dissolving of the non-inclosed cadmium sulfide selenide there remained a glaze stable light red pigment.

EXAMPLE 3

85 grams of $ZrO_2$, 42 grams of $SiO_2$, 34 grams of $CdO_3$, 4.1 grams of Se, 6.3 grams of LiF and 53 grams of $Na_2SO_3$ were well mixed and kneaded with 45 ml of water. The kneaded mixture was calcined in the crucible at 900°C. for 1 hr. and worked up as in example 2. There was obtained a bright red, glaze stable pigment.

EXAMPLE 4

85 grams of $ZrO_2$, 42 grams of $SiO_2$, 27 grams of $CdCO_3$, 6.3 grams of sulfur, 26 grams of $Na_2SO_3$, 6.3 grams of LiF and 3.2 grams of ZnO were kneaded with 45 ml of water and calcined in the crucible at 1,000°C. for 45 minutes. The product was worked up as in example 2. There was obtained a light yellow pigment.

EXAMPLE 5

85 grams of $ZrO_2$, 42 grams of $SiO_2$, 30 grams of $CdCO_3$, 3 grams of Se, 26 grams of $Na_2SO_3$, 6.3 grams of LiF, 4.6 grams of HgS and 3.6 grams of starch were thoroughly mixed and made into a paste with 45 ml of water. After the calcining at 900°C. for 1 hr. and dissolving the non-inclosed sulfide with $HNO_3$ there remained an orange-yellow glaze stable pigment.

EXAMPLE 6

There were mixed 85 grams of $ZrO_2$, 42 grams of $SiO_2$, 34 grams of $CdCO_3$, 6.3 grams of sulfur, 26 grams of $Na_2SO_3$, 6.3 grams of LiF and 4 grams of $Pr_6O_{11}$ and made into a paste with 45 ml of water. Upon calcining at 980°C. for 1 hr. there was formed an intensively yellow pigment which was freed of non-inclosed CdS by treatment with $HNO_3$. The glaze stable yellow pigment consisted of microscopically small yellow zirconium silicate crystals having cadmium sulfide inclusions.

EXAMPLE 7

The same raw mixture was used as in example 6 but replacing the praseodymium oxide by 9 grams of $NH_4VO_3$. The procedure employed was analogous to that of example 6 and there was obtained a glaze stable green pigment that consisted of blue small zirconium silicate crystals having yellow cadmium sulfide inclosures.

EXAMPLE 8

85 grams of $ZrO_2$, 42 grams of $SiO_2$, 34 grams of $CdCO_3$, 26 grams of $Na_2SO_3$, 6.3 grams of LiF, 3.3 grams of tellurium and 3 grams of sucrose were made into a paste, dried and again ground. After calcining at 950°C. for 90 minutes in the crucible the reaction product was ground and boiled with $HNO_3$. There was obtained a rose pigment.

EXAMPLE 9

84.6 grams of $ZrO_2$, 41.7 grams of $SiO_2$, 26.34 grams of $Na_2SO_3$, 6.32 grams of LiF, 3.61 grams of sucrose and 43.69 grams of PbO were made into a paste with 45 ml of water and calcined in the crucible at 950°C. for 1 hr. After grinding and boiling with $HNO_3$ there was obtained a gray, glaze stable pigment of zirconium silicate with PbS inclusions.

EXAMPLE 10

126.3 grams of $SnO_2$, 33.75 grams of $CdCO_3$, 3.10 grams of Se, 26.34 grams of $Na_2SO_3$, 6.32 grams of LiF and 3.6 grams of sucrose were kneaded with 55 ml of water and calcined in the crucible at 1,200°C. for 90 minutes. There was obtained a light rose pigment with Cd(S/Se) inclusions in the small $SnO_2$ crystals.

EXAMPLE 11

126 g $SnO_2$, 24.5 grams of CdO, 19.1 grams of $Na_2SO_3$, 6.3 grams of LiF, 6.4 grams of sucrose, 3.1 grams of Se, 10 grams of $Na_2B_4O_7$ were made into a paste with 70 ml of water and annealed for 10 minutes in a chamotte crucible at 950°C. There was obtained after washing out non inclosed Cd(S,Se) with $HNO_3$ a red glaze stable pigment.

EXAMPLE 12

172 grams of $Al(OH)_3$, 11.2 grams of CdO, 1.75 grams of Se, 8.2 grams of $Na_2SO_3$, 3.3 grams of sucrose, 12.3 grams of $Na_2AlF_6$ and 12.3 grams of $Na_2B_4O_7$ were made into a paste with 220 ml of water and calcined for 90 minutes at 1,100°C. There was formed a rose pigment that observed under the microscope consisted of a rose pigment of Cd(S,Se) particles which grew into the $Al_2O_3$ crystals.

What is claimed is:

1. A plural phase ceramic pigment comprising as an outer phase clear crystals of glaze stable material selected from the group consisting of $ZrO_2$, $ZrSiO_4$, $SnO_2$, $CeO_2$, $CePO_4$, $Al_2O_3$, (Zn, Mg, Co, Ni) (Al, Cr, Fe)$_2O_4$ and $CaSnSiO_5$ and having enclosed therein a member of the group consisting of (1) an inorganic water free colored chalcogenide of zinc, cadmium or mercury or mixed crystals of these chalcogenides wherein the chalcogen has an atomic weight of 32 to 128, (2) PbS, (3)

titanium yellow (4) Thenard's blue as a discrete inner phase.

2. A ceramic pigment according to claim 1 wherein the clear, glaze stable crystals are made of $ZrSiO_4$ or $SnO_2$.

3. A ceramic pigment according to claim 2 wherein the colored compound is a chalcogenide wherein the chalcogen has an atomic weight of 32 to 128.

4. A ceramic pigment according to claim 1 wherein the colored compound is a chalcogenide wherein the chalcogen has an atomic weight of 32 to 128.

5. A ceramic pigment according to claim 4 wherein the colored compound is a sulfide, selenide or telluride of zinc, cadmium or mercury or mixed crystals of these chalcogenides.

6. A ceramic pigment according to claim 4 wherein the clear, glaze stable crystals are of zirconium silicate.

7. A ceramic pigment according to claim 6 wherein the zirconium silicate phase is devoid of coloring.

8. A ceramic pigment according to claim 6 wherein the zirconium silicate phase is colored zirconium silicate.

9. A ceramic pigment according to claim 1 wherein the clear, glaze stable crystals are zirconium silicate crystals.

10. A ceramic pigment according to claim 9 wherein the zirconium silicate phase is devoid of coloring.

11. A ceramic pigment according to claim 9 wherein the zirconium silicate phase is colored zirconium silicate.

12. A ceramic pigment according to claim 11 wherein the zirconium silicate phase is colored with a member of the group consisting of blue zirconium silicate containing vanadium ions, yellow zirconium silicate containing praseodymium ions, green zirconium silicate containing chromium ions, and zirconium iron rose.

13. A ceramic pigment according to claim 12 wherein the zirconium silicate phase is praseodymium dosed zirconium silicate and the inclosed phase is a colored zinc, cadmium or mercury sulfide, selenide or telluride or mixtures thereof.

14. A ceramic pigment according to claim 12 wherein the zirconium silicate phase is vanadium dosed zirconium silicate and the inclosed phase is a colored zinc, cadmium or mercury sulfide, selenide or telluride or mixtures thereof.

15. A ceramic pigment according to claim 14 wherein the zirconium silicate phase is colored.

16. A ceramic pigment according to claim 1 wherein the clear glaze stable crystals are made of zirconium silicate or $SnO_2$ and the colored compound is Thenard's blue, titanium yellow, cadmium yellow or cadmium red.

17. A ceramic pigment according to claim 1 wherein the clear glaze stable crystals are made of zirconium silicate or $SnO_2$ and the colored compound is a zinc, cadmium or mercury sulfide, selenide or telluride or mixtures thereof or is Thenard's blue or titanium yellow.

18. A process for producing a ceramic pigment according to claim 6 comprising forming the sulfide, selenide or telluride or mixed crystals thereof in situ and simultaneously enclosing them while forming the zirconium silicate.

19. A process according to claim 18 wherein the inclosed phase to be formed during the process is 1 to 70 percent of the zirconium silicate.

20. A process according to claim 19 wherein the starting materials are $ZrO_2$, $SiO_2$, an oxygen containing compound of zinc, cadmium or mercury and sulfur, selenium, tellurium or an oxygen containing compound of sulfur, selenium or tellurium.

21. A process according to claim 18 wherein the inner phase is formed from oxygen containing compounds of sulfur and at least one of zinc, cadmium and mercury.

22. A process according to claim 21 wherein the sulfur is employed as sodium sulfite to sodium thiosulfate.

23. A process according to claim 1 wherein the inorganic, water free, colored compound is formed in situ during the synthesis of the crystals of the glaze stable material.

24. A ceramic pigment according to claim 1 wherein the clear, glaze stable crystals are made of $SnO_2$.

* * * * *

UNITED STATES PATENT OFFICE
CERTIFICATE OF CORRECTION

Patent No. 3,847,639      Dated November 12, 1974

Inventor(s) Arno Broll et al

It is certified that error appears in the above-identified patent and that said Letters Patent are hereby corrected as shown below:

The term of this patent subsequent to April 9, 1991 has been disclaimed.

Signed and Sealed this

Twenty-sixth Day of October 1976

[SEAL]

Attest:

RUTH C. MASON
*Attesting Officer*

C. MARSHALL DANN
*Commissioner of Patents and Trademarks*